United States Patent
Lydon et al.

(10) Patent No.: US 8,402,187 B2
(45) Date of Patent: *Mar. 19, 2013

(54) METHOD AND SYSTEM FOR TRANSFERRING BUTTON STATUS INFORMATION BETWEEN A MEDIA PLAYER AND AN ACCESSORY

(75) Inventors: Gregory T. Lydon, Santa Cruz, CA (US); Lawrence G. Bolton, Fremont, CA (US); Emily C. Schubert, San Jose, CA (US); Jesse Lee Dorogusker, Los Altos, CA (US); Donald J. Novotney, San Jose, CA (US); John B. Filson, San Jose, CA (US); David Tupman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/366,203

(22) Filed: Feb. 3, 2012

(65) Prior Publication Data

US 2012/0137028 A1  May 31, 2012

Related U.S. Application Data

(63) Continuation of application No. 12/537,751, filed on Aug. 7, 2009, now Pat. No. 8,135,891, which is a continuation of application No. 11/839,263, filed on Aug. 15, 2007, now Pat. No. 7,590,783, which is a continuation of application No. 11/476,262, filed on Jun. 27, 2006, now Pat. No. 7,305,506, which is a continuation-in-part of application No. 10/833,689, filed on Apr. 27, 2004, now Pat. No. 7,441,062.

(51) Int. Cl.
*G06F 13/42* (2006.01)

(52) U.S. Cl. ............ 710/105; 710/300; 710/72; 710/63; 710/64

(58) Field of Classification Search .......... 710/104–110, 710/313–315, 62–64, 72–74, 300–305
See application file for complete search history.

(56) References Cited

U.S. PATENT DOCUMENTS

| | | | |
|---|---|---|---|
| 4,673,861 A | 6/1987 | Dubovsky et al. |
| 4,850,899 A | 7/1989 | Maynard |
| 4,916,334 A | 4/1990 | Minagawa et al. |
| 4,924,216 A | 5/1990 | Leung |
| 4,938,483 A | 7/1990 | Yavetz |

(Continued)

FOREIGN PATENT DOCUMENTS

| | | |
|---|---|---|
| EP | 1104150 A2 | 5/2001 |
| EP | 1150472 A2 | 10/2001 |

(Continued)

OTHER PUBLICATIONS

Altec Lansing, "inMotion Users Guide," Corp. Headquarters, 535 Rte.6 & 209, Milford, PA 18337. (8 pages).

(Continued)

*Primary Examiner* — Raymond Phan
(74) *Attorney, Agent, or Firm* — Kilpatrick Townsend & Stockton LLP

(57) ABSTRACT

A method, system, and connector interface for transferring status information between a media player and an accessory. The method includes determining, by the accessory, when a button event occurs; and transmitting, by the accessory, at least one button status command to the media player, where the one or more button status commands comprise a context-specific button status command and at least one command associated with a particular media type. According to the method and system disclosed herein, the media player and accessory may utilize a plurality of commands in a variety of environments such as within a connector interface system environment to facilitate the transfer of status information.

29 Claims, 11 Drawing Sheets

U.S. PATENT DOCUMENTS

| | | | |
|---|---|---|---|
| 5,041,025 A | 8/1991 | Haitmanek | |
| 5,051,606 A | 9/1991 | Ikehara | |
| 5,055,069 A | 10/1991 | Townsend et al. | |
| 5,080,603 A | 1/1992 | Mouissie | |
| 5,104,243 A | 4/1992 | Harding | |
| 5,108,313 A | 4/1992 | Adams | |
| 5,150,031 A | 9/1992 | James et al. | |
| 5,186,646 A | 2/1993 | Pederson | |
| 5,247,138 A | 9/1993 | Landmeier | |
| 5,277,624 A | 1/1994 | Champion | |
| 5,471,128 A | 11/1995 | Patino et al. | |
| 5,525,981 A | 6/1996 | Abernethy | |
| 5,546,397 A | 8/1996 | Mahany | |
| 5,586,893 A | 12/1996 | Mosquera | |
| 5,592,588 A | 1/1997 | Reekes et al. | |
| 5,618,045 A | 4/1997 | Kagan et al. | |
| 5,648,712 A | 7/1997 | Hahn | |
| 5,660,558 A | 8/1997 | Osanai et al. | |
| 5,675,467 A | 10/1997 | Nishimura et al. | |
| 5,727,866 A | 3/1998 | Kraines et al. | |
| 5,732,361 A | 3/1998 | Liu | |
| 5,754,027 A | 5/1998 | Oglesbee et al. | |
| 5,830,001 A | 11/1998 | Kinoshita | |
| 5,835,862 A | 11/1998 | Nykanen et al. | |
| 5,845,217 A | 12/1998 | Lindell et al. | |
| 5,859,522 A | 1/1999 | Theobald | |
| 5,884,323 A | 3/1999 | Hawkins et al. | |
| 5,901,049 A | 5/1999 | Schmidt et al. | |
| 5,964,847 A | 10/1999 | Booth, III et al. | |
| 5,975,957 A | 11/1999 | Noda et al. | |
| 5,991,640 A | 11/1999 | Lilja et al. | |
| 6,007,372 A | 12/1999 | Wood | |
| 6,012,105 A | 1/2000 | Rubbmark et al. | |
| 6,031,797 A | 2/2000 | Van Ryzin et al. | |
| 6,053,773 A | 4/2000 | Wu | |
| 6,078,402 A | 6/2000 | Fischer et al. | |
| 6,078,789 A | 6/2000 | Bodenmann et al. | |
| 6,125,455 A | 9/2000 | Yeo | |
| 6,130,518 A | 10/2000 | Gabehart et al. | |
| 6,139,373 A | 10/2000 | Ward et al. | |
| 6,154,773 A | 11/2000 | Roberts et al. | |
| 6,154,798 A | 11/2000 | Lin et al. | |
| 6,161,027 A | 12/2000 | Poirel | |
| 6,169,387 B1 | 1/2001 | Kaib | |
| 6,175,358 B1 | 1/2001 | Scott-Jackson et al. | |
| 6,178,514 B1 | 1/2001 | Wood | |
| 6,184,652 B1 | 2/2001 | Yang | |
| 6,184,655 B1 | 2/2001 | Malackowski | |
| 6,188,265 B1 | 2/2001 | Liu et al. | |
| 6,192,340 B1 | 2/2001 | Abecassis | |
| 6,203,345 B1 | 3/2001 | Roque et al. | |
| 6,204,637 B1 | 3/2001 | Rengan | |
| 6,206,480 B1 | 3/2001 | Thompson | |
| 6,211,581 B1 | 4/2001 | Farrant | |
| 6,211,649 B1 | 4/2001 | Matsuda | |
| 6,224,420 B1 | 5/2001 | Nishio et al. | |
| 6,230,205 B1 | 5/2001 | Garrity et al. | |
| 6,230,322 B1 | 5/2001 | Saib et al. | |
| 6,234,827 B1 | 5/2001 | Nishio et al. | |
| 6,236,395 B1 | 5/2001 | Sezan et al. | |
| 6,247,135 B1 | 6/2001 | Feague | |
| 6,252,380 B1 | 6/2001 | Koenck | |
| 6,255,961 B1 | 7/2001 | Van Ryzin et al. | |
| 6,261,109 B1 | 7/2001 | Liu et al. | |
| 6,262,723 B1 | 7/2001 | Matsuawa et al. | |
| 6,267,623 B1 | 7/2001 | Hisamatsu | |
| 6,268,845 B1 | 7/2001 | Pariza et al. | |
| 6,271,605 B1 | 8/2001 | Carkner et al. | |
| 6,272,328 B1 | 8/2001 | Nguyen et al. | |
| 6,280,251 B1 | 8/2001 | Nishio et al. | |
| 6,283,789 B1 | 9/2001 | Tsai | |
| 6,304,764 B1 | 10/2001 | Pan | |
| 6,314,326 B1 | 11/2001 | Fuchu | |
| 6,314,479 B1 | 11/2001 | Frederick et al. | |
| 6,316,916 B2 | 11/2001 | Bohne | |
| 6,319,061 B1 | 11/2001 | Chen et al. | |
| 6,322,396 B1 | 11/2001 | Kuan | |
| 6,336,365 B1 | 1/2002 | Blackadar et al. | |
| 6,344,727 B1 | 2/2002 | Desai et al. | |
| 6,353,894 B1 | 3/2002 | Pione | |
| 6,354,713 B1 | 3/2002 | Leifer et al. | |
| 6,358,089 B1 | 3/2002 | Kuroda et al. | |
| 6,372,974 B1 | 4/2002 | Gross et al. | |
| 6,377,825 B1 | 4/2002 | Kennedy et al. | |
| 6,385,596 B1 | 5/2002 | Wiser et al. | |
| 6,394,905 B1 | 5/2002 | Takeda et al. | |
| 6,418,421 B1 | 7/2002 | Hurtado et al. | |
| 6,429,622 B1 | 8/2002 | Svensson | |
| 6,429,879 B1 | 8/2002 | Sturgeon et al. | |
| 6,431,915 B1 | 8/2002 | Ko | |
| 6,453,371 B1 | 9/2002 | Hampson et al. | |
| 6,454,592 B2 | 9/2002 | Takagi | |
| 6,461,173 B1 | 10/2002 | Mizuno et al. | |
| 6,464,542 B1 | 10/2002 | Lee | |
| 6,468,110 B2 | 10/2002 | Fujino et al. | |
| 6,476,825 B1 | 11/2002 | Croy et al. | |
| 6,478,603 B1 | 11/2002 | Wu | |
| 6,483,428 B1 | 11/2002 | Fish et al. | |
| 6,485,328 B1 | 11/2002 | Wu | |
| 6,489,751 B2 | 12/2002 | Small | |
| 6,501,441 B1 | 12/2002 | Ludtke et al. | |
| 6,505,160 B1 | 1/2003 | Levy et al. | |
| 6,524,119 B2 | 2/2003 | Kato et al. | |
| 6,526,287 B1 | 2/2003 | Lee | |
| 6,535,981 B1 | 3/2003 | Shimizu | |
| 6,558,201 B1 | 5/2003 | Begley et al. | |
| 6,559,773 B1 | 5/2003 | Berry | |
| 6,577,877 B1 | 6/2003 | Charlier et al. | |
| 6,589,076 B1 | 7/2003 | Davis et al. | |
| 6,591,085 B1 | 7/2003 | Grady | |
| 6,608,264 B1 | 8/2003 | Fouladpour | |
| 6,608,399 B2 | 8/2003 | McConnell et al. | |
| 6,614,232 B1 | 9/2003 | Mukai | |
| 6,616,473 B2 | 9/2003 | Kamata et al. | |
| 6,629,197 B1 | 9/2003 | Bhogal et al. | |
| 6,642,629 B2 | 11/2003 | DeLeeuw | |
| 6,643,777 B1 | 11/2003 | Chu | |
| 6,651,138 B2 | 11/2003 | Lai et al. | |
| 6,653,813 B2 | 11/2003 | Khatri | |
| 6,663,420 B1 | 12/2003 | Xiao | |
| 6,665,803 B2 | 12/2003 | Lunsford et al. | |
| 6,670,997 B1 | 12/2003 | Nortrup | |
| 6,674,995 B1 | 1/2004 | Meyers et al. | |
| 6,687,454 B1 | 2/2004 | Kuroiwa | |
| 6,697,944 B1 | 2/2004 | Jones et al. | |
| 6,708,283 B1 | 3/2004 | Nelvin et al. | |
| 6,724,339 B2 | 4/2004 | Conway et al. | |
| 6,725,061 B1 | 4/2004 | Hutchison, IV et al. | |
| 6,728,546 B1 | 4/2004 | Peterson et al. | |
| 6,728,729 B1 | 4/2004 | Jawa et al. | |
| 6,747,859 B2 | 6/2004 | Walbeck et al. | |
| 6,754,468 B1 | 6/2004 | Sieben et al. | |
| 6,761,635 B2 | 7/2004 | Hoshino et al. | |
| 6,774,939 B1 | 8/2004 | Peng | |
| 6,776,626 B2 | 8/2004 | Huang et al. | |
| 6,776,660 B2 | 8/2004 | Kubota et al. | |
| 6,776,665 B2 | 8/2004 | Huang | |
| 6,799,226 B1 | 9/2004 | Robbin et al. | |
| 6,801,964 B1 | 10/2004 | Mahdavi | |
| 6,813,528 B1 | 11/2004 | Yang | |
| 6,816,376 B2 | 11/2004 | Bright et al. | |
| 6,830,160 B2 | 12/2004 | Risolia | |
| 6,859,538 B1 | 2/2005 | Voltz | |
| 6,859,854 B2 | 2/2005 | Kwong | |
| 6,879,843 B1 | 4/2005 | Kim | |
| 6,928,295 B2 | 8/2005 | Olson et al. | |
| 6,931,266 B2 | 8/2005 | Miyoshi et al. | |
| 6,931,456 B2 | 8/2005 | Payne et al. | |
| 6,939,177 B2 | 9/2005 | Kato et al. | |
| 6,944,704 B2 | 9/2005 | Brelin | |
| 6,991,483 B1 | 1/2006 | Milan et al. | |
| 7,004,787 B2 | 2/2006 | Milan | |
| 7,006,793 B2 | 2/2006 | Himmel et al. | |
| 7,013,164 B2 | 3/2006 | Lin | |
| 7,040,919 B2 | 5/2006 | Yao | |
| 7,046,230 B2 | 5/2006 | Zadesky | |
| 7,050,783 B2 | 5/2006 | Curtiss et al. | |

| | | |
|---|---|---|
| 7,054,888 B2 | 5/2006 | LaChapelle et al. |
| 7,062,261 B2 | 6/2006 | Goldstein et al. |
| 7,108,560 B1 | 9/2006 | Chou et al. |
| 7,120,462 B2 | 10/2006 | Kumar |
| 7,127,678 B2 | 10/2006 | Bhesania et al. |
| 7,127,879 B2 | 10/2006 | Zhu et al. |
| 7,149,543 B2 | 12/2006 | Kumar |
| 7,155,545 B1 | 12/2006 | Wang |
| 7,167,112 B2 | 1/2007 | Andersen et al. |
| 7,167,935 B2 | 1/2007 | Hellberg |
| 7,187,947 B1 | 3/2007 | White et al. |
| 7,187,948 B2 | 3/2007 | Alden |
| 7,215,042 B2 | 5/2007 | Yan |
| 7,281,214 B2 | 10/2007 | Fadell |
| 7,293,122 B1 | 11/2007 | Schubert et al. |
| 7,293,227 B2 | 11/2007 | Plastina et al. |
| 7,299,304 B2 | 11/2007 | Saint-Hilaire et al. |
| 7,303,282 B2 | 12/2007 | Dwyer et al. |
| 7,304,685 B2 | 12/2007 | Park et al. |
| 7,305,254 B2 | 12/2007 | Findikli |
| 7,305,506 B1 | 12/2007 | Lydon et al. |
| 7,324,833 B2 | 1/2008 | White et al. |
| 7,362,963 B2 | 4/2008 | Lin |
| 7,363,129 B1 | 4/2008 | Barnicle et al. |
| 7,391,963 B2 | 6/2008 | Chen et al. |
| 7,415,563 B1 | 8/2008 | Holden et al. |
| 7,441,058 B1 | 10/2008 | Bolton et al. |
| 7,441,062 B2 | 10/2008 | Novotney et al. |
| 7,444,388 B1 | 10/2008 | Svendsen |
| 7,450,961 B1 | 11/2008 | Heubel et al. |
| 7,454,019 B2 | 11/2008 | Williams |
| 7,493,645 B1 | 2/2009 | Tranchina |
| 7,526,588 B1 | 4/2009 | Schubert et al. |
| 7,529,870 B1 | 5/2009 | Schubert et al. |
| 7,529,871 B1 | 5/2009 | Schubert et al. |
| 7,529,872 B1 | 5/2009 | Schubert et al. |
| 7,558,894 B1 | 7/2009 | Lydon et al. |
| 7,587,540 B2 | 9/2009 | Novotney et al. |
| 7,590,783 B2 | 9/2009 | Lydon et al. |
| 7,610,350 B2 | 10/2009 | Abdulrahiman et al. |
| 7,634,605 B2 | 12/2009 | Laefer et al. |
| 7,660,929 B2 | 2/2010 | Novotney et al. |
| 7,670,263 B2 | 3/2010 | Ellis et al. |
| 7,673,020 B2 | 3/2010 | Rosenbloom et al. |
| 7,673,083 B2 | 3/2010 | Laefer et al. |
| 7,680,849 B2 | 3/2010 | Heller et al. |
| 7,702,833 B2 | 4/2010 | Novotney et al. |
| 7,757,026 B2 | 7/2010 | Novotney et al. |
| 7,779,185 B2 | 8/2010 | Schubert et al. |
| 7,791,319 B2 | 9/2010 | Veselic et al. |
| 7,797,471 B2 | 9/2010 | Laefer et al. |
| 7,853,746 B2 | 12/2010 | Novotney et al. |
| 7,877,532 B2 | 1/2011 | Schubert et al. |
| 8,135,891 B2 * | 3/2012 | Lydon et al. .................. 710/105 |
| 2001/0003205 A1 | 6/2001 | Gilbert |
| 2001/0005641 A1 | 6/2001 | Matsumoto et al. |
| 2001/0006884 A1 | 7/2001 | Matsumoto |
| 2001/0042107 A1 | 11/2001 | Palm |
| 2002/0002035 A1 | 1/2002 | Sim et al. |
| 2002/0010759 A1 | 1/2002 | Hitson et al. |
| 2002/0015362 A1 | 2/2002 | Cowgill et al. |
| 2002/0025042 A1 | 2/2002 | Saito |
| 2002/0029303 A1 | 3/2002 | Nguyen |
| 2002/0065074 A1 | 5/2002 | Cohn et al. |
| 2002/0068610 A1 | 6/2002 | Anvekar et al. |
| 2002/0072390 A1 | 6/2002 | Uchiyama |
| 2002/0103008 A1 | 8/2002 | Rahn et al. |
| 2002/0105861 A1 | 8/2002 | Leapman |
| 2002/0108108 A1 | 8/2002 | Akaiwa et al. |
| 2002/0115480 A1 | 8/2002 | Huang |
| 2002/0116533 A1 | 8/2002 | Holliman et al. |
| 2002/0120850 A1 | 8/2002 | Walker et al. |
| 2002/0132651 A1 | 9/2002 | Jinnouchi |
| 2002/0151327 A1 | 10/2002 | Levitt |
| 2002/0152874 A1 | 10/2002 | Vilcauskas et al. |
| 2002/0156546 A1 | 10/2002 | Ramaswamy |
| 2002/0156949 A1 | 10/2002 | Kubo et al. |
| 2002/0161865 A1 | 10/2002 | Nguyen |
| 2002/0173273 A1 | 11/2002 | Spurgat et al. |
| 2002/0174269 A1 | 11/2002 | Spurgat et al. |
| 2002/0194621 A1 | 12/2002 | Tran et al. |
| 2003/0004934 A1 | 1/2003 | Qian |
| 2003/0011608 A1 | 1/2003 | Wada |
| 2003/0028664 A1 | 2/2003 | Tan et al. |
| 2003/0041206 A1 | 2/2003 | Dickie |
| 2003/0059022 A1 | 3/2003 | Nebiker et al. |
| 2003/0067741 A1 | 4/2003 | Alfonso et al. |
| 2003/0073432 A1 | 4/2003 | Meade |
| 2003/0079038 A1 | 4/2003 | Robbin et al. |
| 2003/0090988 A1 | 5/2003 | Sun et al. |
| 2003/0097379 A1 | 5/2003 | Ireton |
| 2003/0110403 A1 | 6/2003 | Crutchfield et al. |
| 2003/0151621 A1 | 8/2003 | McEvilly et al. |
| 2003/0167318 A1 | 9/2003 | Robbin et al. |
| 2003/0172209 A1 | 9/2003 | Liu et al. |
| 2003/0185395 A1 | 10/2003 | Lee et al. |
| 2003/0198015 A1 | 10/2003 | Vogt |
| 2003/0212895 A1 | 11/2003 | Kisliakiv |
| 2003/0215102 A1 | 11/2003 | Marlowe |
| 2003/0220988 A1 | 11/2003 | Hymel |
| 2003/0236075 A1 | 12/2003 | Johnson et al. |
| 2003/0237043 A1 | 12/2003 | Novak et al. |
| 2004/0003300 A1 | 1/2004 | Malueg et al. |
| 2004/0019497 A1 | 1/2004 | Volk et al. |
| 2004/0039860 A1 | 2/2004 | Mills et al. |
| 2004/0048569 A1 | 3/2004 | Kawamura |
| 2004/0055446 A1 | 3/2004 | Robbin et al. |
| 2004/0090998 A1 | 5/2004 | Chen |
| 2004/0103223 A1 | 5/2004 | Gabehart et al. |
| 2004/0116005 A1 | 6/2004 | Choi |
| 2004/0151327 A1 | 8/2004 | Marlowe |
| 2004/0162029 A1 | 8/2004 | Grady |
| 2004/0164708 A1 | 8/2004 | Veselic et al. |
| 2004/0172533 A1 | 9/2004 | DeMello et al. |
| 2004/0186935 A1 | 9/2004 | Bel et al. |
| 2004/0194154 A1 | 9/2004 | Meadors et al. |
| 2004/0198436 A1 | 10/2004 | Alden |
| 2004/0224638 A1 | 11/2004 | Fadell et al. |
| 2004/0235339 A1 | 11/2004 | Sato et al. |
| 2004/0249994 A1 | 12/2004 | Shapiro et al. |
| 2004/0252966 A1 | 12/2004 | Holloway et al. |
| 2004/0267812 A1 | 12/2004 | Harris et al. |
| 2004/0267825 A1 | 12/2004 | Novak et al. |
| 2004/0268397 A1 | 12/2004 | Dunbar et al. |
| 2005/0001589 A1 | 1/2005 | Edington |
| 2005/0014119 A1 | 1/2005 | Rudakov |
| 2005/0014531 A1 | 1/2005 | Findikli |
| 2005/0014536 A1 | 1/2005 | Grady |
| 2005/0015355 A1 | 1/2005 | Heller et al. |
| 2005/0018768 A1 | 1/2005 | Mabey et al. |
| 2005/0022212 A1 | 1/2005 | Bowen |
| 2005/0047071 A1 | 3/2005 | Tse Chun Hin |
| 2005/0080915 A1 | 4/2005 | Shoemaker et al. |
| 2005/0135790 A1 | 6/2005 | Hutten |
| 2005/0138433 A1 | 6/2005 | Linetsky |
| 2005/0149213 A1 | 7/2005 | Guzak et al. |
| 2005/0149551 A1 | 7/2005 | Fong et al. |
| 2005/0181756 A1 | 8/2005 | Lin |
| 2005/0198189 A1 | 9/2005 | Robinson et al. |
| 2005/0207726 A1 | 9/2005 | Chen |
| 2005/0227612 A1 | 10/2005 | Helstrom et al. |
| 2005/0239333 A1 | 10/2005 | Watanabe et al. |
| 2005/0240705 A1 | 10/2005 | Novotney et al. |
| 2005/0246375 A1 | 11/2005 | Manders et al. |
| 2005/0251565 A1 | 11/2005 | Weel |
| 2005/0281185 A1 | 12/2005 | Kawasaki |
| 2006/0015826 A1 | 1/2006 | Shiozawa et al. |
| 2006/0031545 A1 | 2/2006 | Manders et al. |
| 2006/0056796 A1 | 3/2006 | Nishizawa et al. |
| 2006/0088228 A1 | 4/2006 | Marriott et al. |
| 2006/0116009 A1 | 6/2006 | Langberg et al. |
| 2006/0143680 A1 | 6/2006 | Adachi |
| 2006/0156415 A1 | 7/2006 | Rubinstein et al. |
| 2006/0161621 A1 | 7/2006 | Rosenberg |
| 2006/0163358 A1 | 7/2006 | Biderman |
| 2006/0168298 A1 | 7/2006 | Aoki et al. |
| 2006/0184456 A1 | 8/2006 | de Janasz |
| 2006/0188237 A1 | 8/2006 | Watanabe et al. |

| | | | |
|---|---|---|---|
| 2006/0205349 A1 | 9/2006 | Passier et al. | |
| 2006/0224620 A1 | 10/2006 | Silverman et al. | |
| 2006/0236245 A1 | 10/2006 | Agarwal et al. | |
| 2006/0247851 A1 | 11/2006 | Morris | |
| 2006/0258289 A1 | 11/2006 | Dua | |
| 2006/0277555 A1 | 12/2006 | Howard | |
| 2006/0294209 A1 | 12/2006 | Rosenbloom et al. | |
| 2007/0011138 A1 | 1/2007 | Boucard | |
| 2007/0018947 A1 | 1/2007 | Toro-Lira | |
| 2007/0056012 A1 | 3/2007 | Kwon et al. | |
| 2007/0056013 A1 | 3/2007 | Duncan | |
| 2007/0070856 A1 | 3/2007 | Tebele | |
| 2007/0077784 A1 | 4/2007 | Kalayjian et al. | |
| 2007/0080823 A1 | 4/2007 | Fu et al. | |
| 2007/0083750 A1 | 4/2007 | Miura et al. | |
| 2007/0083814 A1 | 4/2007 | Wilbrink et al. | |
| 2007/0086724 A1 | 4/2007 | Grady et al. | |
| 2007/0106760 A1 | 5/2007 | Houh et al. | |
| 2007/0130592 A1 | 6/2007 | Haeusel | |
| 2007/0173197 A1 | 7/2007 | Hsiung | |
| 2007/0173294 A1 | 7/2007 | Hsiung | |
| 2007/0206827 A1 | 9/2007 | Tupman et al. | |
| 2007/0209081 A1 | 9/2007 | Morris | |
| 2007/0226238 A1 | 9/2007 | Kiilerich et al. | |
| 2007/0226384 A1 | 9/2007 | Robbin et al. | |
| 2007/0230910 A1 | 10/2007 | Welch et al. | |
| 2007/0233294 A1 | 10/2007 | Holden et al. | |
| 2007/0233295 A1 | 10/2007 | Laefer et al. | |
| 2007/0234420 A1 | 10/2007 | Novotney et al. | |
| 2007/0236482 A1 | 10/2007 | Proctor et al. | |
| 2007/0244984 A1 | 10/2007 | Svendsen | |
| 2007/0247794 A1 | 10/2007 | Jaffe et al. | |
| 2007/0271387 A1 | 11/2007 | Lydon et al. | |
| 2007/0280489 A1 | 12/2007 | Roman et al. | |
| 2007/0291404 A1 | 12/2007 | Morse et al. | |
| 2007/0300155 A1 | 12/2007 | Laefer et al. | |
| 2008/0010014 A1 | 1/2008 | Hess | |
| 2008/0025172 A1 | 1/2008 | Holden et al. | |
| 2008/0034325 A1 | 2/2008 | Ording | |
| 2008/0055272 A1 | 3/2008 | Anzures et al. | |
| 2008/0065722 A1 | 3/2008 | Brodersen et al. | |
| 2008/0155129 A1 | 6/2008 | Khedouri et al. | |
| 2008/0188209 A1 | 8/2008 | Dorogusker et al. | |
| 2009/0013110 A1 | 1/2009 | Novotney et al. | |
| 2009/0013253 A1 | 1/2009 | Laefer et al. | |
| 2009/0125134 A1 | 5/2009 | Bolton et al. | |
| 2009/0132076 A1 | 5/2009 | Holden et al. | |
| 2009/0198361 A1 | 8/2009 | Schubert et al. | |
| 2009/0204244 A1 | 8/2009 | Schubert et al. | |
| 2009/0204738 A1 | 8/2009 | Schubert et al. | |
| 2009/0210079 A1 | 8/2009 | Schubert et al. | |
| 2009/0249101 A1 | 10/2009 | Lydon et al. | |
| 2009/0292835 A1 | 11/2009 | Novotney et al. | |
| 2009/0299506 A1 | 12/2009 | Lydon et al. | |
| 2010/0049350 A1 | 2/2010 | Laefer et al. | |
| 2010/0106879 A1 | 4/2010 | Laefer et al. | |
| 2010/0312931 A1 | 12/2010 | Schubert et al. | |
| 2010/0312932 A1 | 12/2010 | Schubert et al. | |
| 2011/0066775 A1 | 3/2011 | Schubert et al. | |
| 2011/0066776 A1 | 3/2011 | Schubert et al. | |
| 2012/0102236 A1 | 4/2012 | Schubert et al. | |

FOREIGN PATENT DOCUMENTS

| | | | |
|---|---|---|---|
| EP | 1367734 A1 | 12/2003 | |
| EP | 1498899 A1 | 1/2005 | |
| EP | 1594319 A1 | 11/2005 | |
| EP | 1672613 A2 | 6/2006 | |
| GB | 2405718 A | 3/2005 | |
| JP | 07-176351 A | 7/1995 | |
| JP | 10-321302 A | 4/1998 | |
| JP | 10-334993 A | 12/1998 | |
| JP | 11-288420 A | 10/1999 | |
| JP | 2000-214953 A | 8/2000 | |
| JP | 2000-223215 A | 8/2000 | |
| JP | 2000-223216 A | 8/2000 | |
| JP | 2000-223218 A | 8/2000 | |
| JP | 2001-035603 A | 2/2001 | |
| JP | 2001-069165 A | 3/2001 | |
| JP | 2001-196133 A | 7/2001 | |
| JP | 2001-230021 A | 8/2001 | |
| JP | 2001-332350 A | 11/2001 | |
| JP | 2002-025720 A | 1/2002 | |
| JP | 2002-140304 A | 5/2002 | |
| JP | 2002-203641 A | 7/2002 | |
| JP | 2002-245719 A | 8/2002 | |
| JP | 2002-252566 A | 9/2002 | |
| JP | 3090747 U | 10/2002 | |
| JP | 2002-342659 A | 11/2002 | |
| JP | 2002-374447 A | 12/2002 | |
| JP | 2003-017165 A | 1/2003 | |
| JP | 2003-032351 A | 1/2003 | |
| JP | 2003-058430 A | 2/2003 | |
| JP | 2003-274386 A | 9/2003 | |
| JP | 2004-078538 A | 3/2004 | |
| JP | 2004-259280 A | 9/2004 | |
| JP | 2008053955 A | 3/2008 | |
| JP | 2008071419 A | 3/2008 | |
| JP | 2009303001 A | 12/2009 | |
| TW | 530267 | 5/2003 | |
| WO | 99/26330 A2 | 5/1999 | |
| WO | 99/48089 A2 | 9/1999 | |
| WO | 00/39907 A1 | 7/2000 | |
| WO | 00/60450 A1 | 10/2000 | |
| WO | 02/49314 A2 | 6/2002 | |
| WO | 03/036541 A1 | 5/2003 | |
| WO | 03/036957 A1 | 5/2003 | |
| WO | 03/056776 A1 | 7/2003 | |
| WO | 03/073688 A1 | 9/2003 | |
| WO | 2004/084413 A2 | 9/2004 | |
| WO | 2004/095772 A1 | 11/2004 | |
| WO | 2004/112311 A1 | 12/2004 | |
| WO | 2005/109781 A1 | 11/2005 | |
| WO | 2005/119463 A2 | 12/2005 | |
| WO | 2006/071364 A1 | 7/2006 | |
| WO | 2006/073702 A1 | 7/2006 | |
| WO | 2006/080957 A2 | 8/2006 | |

OTHER PUBLICATIONS

Anonymous, "Future of Digital Music in Windows," Microsoft Windows Hardware Developer Central Archive, Dec. 4, 2001[Online], [retrieved on Jan. 15, 2008]. <URL:http://www.microsoft.com/whdc/archive/digitaudio.mspx> (3 pages).

Anonymous, "Introduction to Digital Audio," Microsoft Windows Hardware Developer Central Archive, Dec. 4, 2001 [Online], [retrieved on Jan. 15, 2008]. <URL:http://www.microsoft.com/whdc/archive/digitaudio.mspx>(2 pages).

Anonymous, "Windows and Red Book Audio," Microsoft Windows Hardware Developer Central Archive, Dec. 4, 2001 [Online], [retrieved Jan. 15, 2008]. <URL:http://www.microsoft.com/whdc/archive/Dmfuture.mspx> (2 pages).

"A Serial Bus on Speed Diagram: Getting Connected with FireWire," downloaded Oct. 16, 2001, PC Magazine: PC Tech (A Serial Bus on Speed) wysiwyg://51http://www.zdnet.com/pctech/content/18/10/tu1810.007.html p. 7. (2 pages).

Belkin iPod Voice Recorder, Product Specification Sheet, printed Jun. 16, 2004. (2 pages).

Bindra, "Standard Turns Monitor into I/O Hub," Electronic Engineering Times, vol. 918, Sep. 6, 1996, p. 14. (1 page).

Brentrup, "Introduction to Public Key Cryptography Demystified," Campus Technology, printed from http://www.campus-technology.com/article.asp?id=7626 on Oct. 6, 2004. (5 pages).

Brown, "Making USB Work," downloaded Oct. 16, 2001, PC Magazine: PC Tech wysiwyg:/155/http://www.zdnet.com/pcmag/pctech/content!18/04/tu1804.001.html (2 pages).

"Cables to Go," download Oct. 16, 2001 http://www.cablestogo.com/product.asp?cat%5Fid=601&sku=27028 (1 page).

Chen et al., "Design and Implemeation of a Hard Disk-Based Entertainment Device for Managing Media Contents on the Go," Consumer Electronics, 1005. (ISCE 2005). Proceedings of the Ninth International Symposium on, pp. 328-333, Jun. 14-16, 2005. (6 pages).

Crawford et al., "Sample rate conversion and bit rate reduction in the studio," IEEE Colloquium on Digital Audio Signal Processing, May 22, 1991, pp. 8/1-8/3. (3 pages).

Derman, "Monitors Make Net Connections," Electronic Engineering Times, vol. 933, 1996, pp. 60 and 69. (2 pages).

"ExpressBus™ F5U010," User Guide Packing Checklist, Belkin Components Product Warranty. (2 pages).

"FireWire", downloaded Oct. 16, 2001; si_wyg:/ /42/http://developer.apple._com/hardware/Fire_Wire (2 pages).

"Fire Wire Connector," downloaded Oct. 16, 2001, wysiwyg://76/http://developer.apple.com/...es/Macintosh_CPUs-G3/ibook/ibook-27.html (2 pages).

Fried, "FireWire poised to become ubiquitous," downloaded Oct. 16, 2001, CNET News.com, 1394 Trade Association: Press, wysiwyg:/132/http:/_113_94ta.org/Press/200_1_Press/august!8.2_7.b.html (3 pages).

Fried, "New Fire Wire to blaze faster trail," downloaded Oct. 16, 2001, CNET News.com, http://news. cnet.com/news/0-I006-200-6021210.html (5 pages).

"How to Connect Your Computer PC Hardware", downloaded Oct. 16, 2001, http:///www.scar.utoronto.ca!~ccweb/faculty/connect-howto.html (5 pages).

"IEEE 1394/USB Comparison," downloaded Oct. 16, 2001, www.genitech.com.aulLIBRARY/TechSupportiinfobits/firewirevsusb.html (4 pages).

"Introduction to Public Key Cryptography," Oct. 9, 1998, printed from http://developer.netscape.com/docs/manuals/security/pkin/contents.html on Oct. 6, 2004. (21 pages).

iPod Classic User's Guide, acquired from apple.com, 2002. (44 pages).

iPod nano Features Guide, acquired from apple.com, 2008. (72 pages).

iPod touch User's Guide, acquired from apple.com, 2008. (120 pages).

"iPodDock/iPod Cradle," www.bookendzdocks.com/bookendz/dock_cradle.html, downloaded Feb. 27, 2003. (2 pages).

Lambert, "Digital Audio Interfaces," Journal of the Audio Engineering Society, Audio Engineering Society, New York, NY, vol. 38, No. 9, (Sep. 1, 1990), pp. 681-684, 686, 688, 690, 692 and 696, XP000175146 ISSN: 1549-4950 figures 9, 10. (10 pages).

Lewis, "On Technology" Fortune Magazine, Dec. 9, 2002, p. 240. (1 page).

LSI Logic's Broadcast PC Card Brings New Multimedia Capabilities to Personal Computing. (Nov. 16). PR Newswire, 1. Retrieved Jun. 26, 2010, from Business Dateline. (3 pages).

MAXTech Technology Ltd., CES 2000/Las Vegas, Jan. 6-9, 2000, [on line], [retrieved on Sep. 26, 2008]. Retrieved from the Internet <URL:http://web.archive.org/web/20000930170634/www.maxtech.com.hk/t-details.htm>. (2 pages).

MAXTech Technology Ltd., CES 2000/Las Vegas, Jan. 6-9, 2000, [online], [retrieved on Sep. 23, 2008]. Retrieved from the Internet <URL:http://web.archive.org/web/20010223230441/www.maxtech.com.hk/g-p06.htm>. (2 pages).

Menezes et al., "Handbook of Applied Cryptography," *Identification and Entity Authentication*, Jan. 1, 1997, pp. 385-424. (41 pages).

Microsoft, "Media Transport Protocol Implementation Details," 2005. (18 pages).

"MPV™ Music Profile Specification Revision 1.00" Internet Citation [online] (Jan. 7, 2004) URL:http//www.osta.org/mpv/public/specs/MPVMusic-Prof-Spec-1.00.pdf> [retrieved Jun. 20, 2006] the whole document. (70 pages).

Networking Tech Note, "1394 Standards and Specifications." (3 pages).

"Neuros MP3 Digital Audio Computer," www.neurosaudio.com, downloaded Apr. 9, 2003. (6 pages).

NOMAD II Player Version 1.0 (CLI) (User's Manual), Creative Technology, Ltd., Jan. 2000. (46 pages).

"PMC FW2 IEEE1394 FireWire Controller", downloaded Oct. 16, 2001, http://www.bvmltd.co.uk/PMCfw2ds.html (10 pages).

Severance, "FireWire Finally Comes Home," Michigan State University, Standards, Nov. 1998, pp. 117-118. (2 pages).

Sinitsyn, "Synchronization Framework for Personal Mobile Servers," Pervasive Computing and Communications Workshops (PERCOMW'04), Proceedings of the Second IEEE Annual Conference, Piscataway, NJ, USA, IEEE, Mar. 14, 2004, pp. 208-212. (3 pages).

Slay et al., "iPod Forensics: Forensically Sound Examination of an Apple iPod," *System Sciences*, 2007. HICSS 2007. 40th Annual Hawaii Internation Conference on, pp. 1-9, Jan. 2007. (9 pages).

Teener, "Understanding Fire Wire: The IEEE 1394 Standards and Specifications," downloaded Oct. 16, 2001, wysiwyg:119/http:1Iwww.chipcenter.com/networking/ieee_1394/main/html (5 pages).

"The Authoritative Dictionary of IEEE Standards Terms, Seventh Edition," Published by Standards Information Network, IEEE Press, 2000. (3 pages).

"Universal Serial Bus Specification—Rev 2.0," *Chapter 6: Compaq Hewlett-Packard*, Apr. 27, 2000, pp. 85, 99-100. (7 pages).

"Universal Serial Bus Specification—Rev 2.0," XP002474828, *Chapter 9: USB Device Framework*, pp. 239-274. (36 pages).

Vitaliano, "Why FireWire is Hot!Hot!Hot!" downloaded Oct. 16, 2001, "Impact.FireWire.SideBar" http://www.vxm.com/21R.35.html (4 pages).

Whittle, "Public Key Authentication Framework: Tutorial," First Principles Consulting, Jun. 2, 1996, downloaded Oct. 6, 2004, http://www.ozemail.com.au/~firstpr/crypto/pkaftute.htm (7 pages).

* cited by examiner

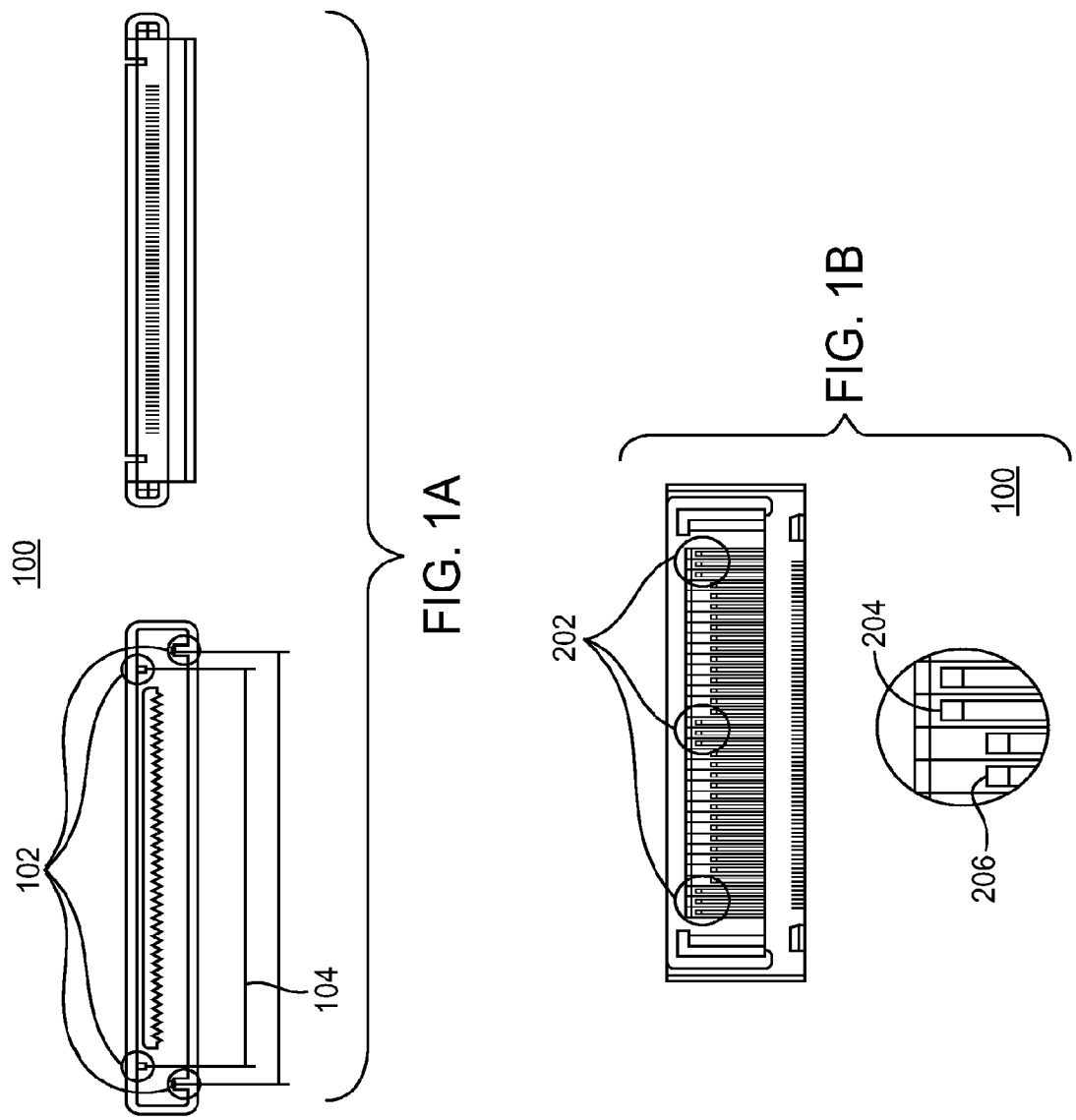

| Pin | Signal Name | I/O | Function |
| --- | --- | --- | --- |
| 1 | DGND | I | Digital Ground |
| 2 | DGND | I | Digital Ground |
| 3 | TPA+ | I/O | Firewire signal |
| 4 | USB D+ | I/O | USB signal |
| 5 | TPA- | I/O | Firewire signal |
| 6 | USB D- | I/O | USB signal |
| 7 | TPB+ | I/O | Firewire signal |
| 8 | USB PWR | I | USB power in. NOT for powering; only to detect USB host |
| 9 | TPB- | I/O | Firewire signal |
| 10 | Accessory Identify | I | Pull down in dock to notify iPod of specific device |
| 11 | F/W PWR+ | I | Firewire and charger input power (8V to 30V dc) |
| 12 | F/W PWR+ | I | Firewire and charger input power (8V to 30V dc) |
| 13 | Accessory Pwr(3V3) | O | 3.3V output from iPod. Current limited to 100mA. |
| 14 | Reserved | | |
| 15 | DGND | GND | Digital Ground in iPod |
| 16 | DGND | GND | Digital Ground in iPod |
| 17 | Reserved | | |
| 18 | Dock Tx | I | Serial protocol (Data to iPod) |
| 19 | Dock Rx | O | Serial protocol (Data from iPod) |
| 20 | Accessory Detect | I/O | |
| 21 | S Video Y | O | Luminance Component |
| 22 | S Video C | O | Chrominance Component |
| 23 | Video Composite | O | Composite Signal |
| 24 | Remote Sense | I | Detect Remote |
| 25 | LINE-IN L | I | Line level input to the iPod for the left channel |
| 26 | LINE-IN R | I | Line level input to the iPod for the right channel |
| 27 | LINE-OUT L | O | Line level output to the iPod for the left channel |
| 28 | LINE-OUT R | O | Line level output to the iPod for the right channel |
| 29 | Audio Return | GND | Audio return - Signal, never to be grounded inside accessory |
| 30 | DGND | GND | Digital Ground iPod |
| 31 | Chassis | | Chassis ground for connector shell |
| 32 | Chassis | | Chassis ground for connector shell |

FIG. 3A

| Pin | Signal Name | I/O | Function |
|---|---|---|---|
| 1 | Audio Out Left / Mono Mic In | I/O | 30mW audio out left channel, also doubles as mono mic in |
| 2 | HP Detect | I | Internal Switch to detect plug insertion |
| 3 | Audio Return | GND | Audio return for left and right audio |
| 4 | Audio Out Right | O | 30mW audio out right channel |
| 5 | Composite Video | O | Video Signal |
| 6 | Accessory 3.3 V | O | 3.3V Accessory power 100mA max |
| 7 | Tx | O | Serial protocol (Data from iPod to Device) |
| 8 | Rx | I | Serial protocol (Data to iPod from Device) |
| 9 | D GND | GND | Digital ground for accessory |

FIG. 3B

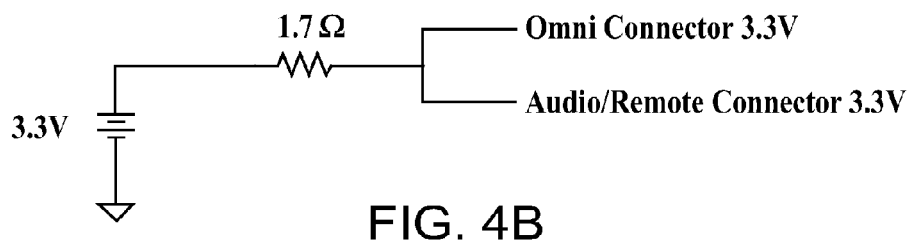

FIG. 4B

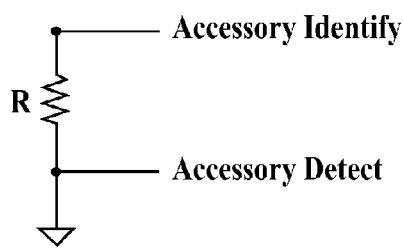

FIG. 4C

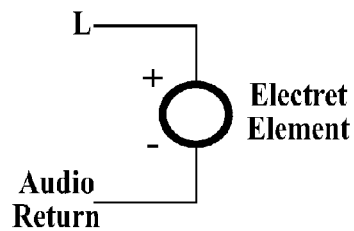

FIG. 4D

METHOD AND SYSTEM FOR TRANSFERRING BUTTON STATUS INFORMATION BETWEEN A MEDIA PLAYER AND AN ACCESSORY

CROSS-REFERENCES TO RELATED APPLICATIONS

This application is a continuation of U.S. patent application Ser. No. 12/537,751, entitled "Method and System for Transferring Button Status Information Between A Media Player And An Accessory," filed Aug. 7, 2009, which is a continuation of U.S. patent application Ser. No. 11/839,263, entitled "Method and System For Transferring Status Information Between A Media Player And An Accessory," filed Aug. 15, 2007, which is a continuation of U.S. patent application Ser. No. 11/476,262, entitled "Method and System For Transferring Status Information Between A Media Player And An Accessory," filed on Jun. 27, 2006, which is a continuation-in-part of U.S. patent application Ser. No. 10/833,689, entitled "Connector Interface System for a Multi-Communication Device," filed on Apr. 27, 2004. The respective disclosures of these applications are incorporated herein by reference in their entirety.

FIELD OF THE INVENTION

The present invention relates generally to electrical devices and more particularly to electrical devices such as media players that communicate with accessory devices.

BACKGROUND OF THE INVENTION

A media player stores media assets, such as audio tracks or photos that can be played or displayed on the media player. One example of a media player is the iPod® media player, which is available from Apple Inc. of Cupertino, Calif. Often, a media player acquires its media assets from a host computer that serves to enable a user to manage media assets. As an example, the host computer can execute a media management application to manage media assets. One example of a media management application is iTunes®, version 6.0, produced by Apple Inc.

A media player typically includes one or more connectors or ports that can be used to interface to the media player. For example, the connector or port can enable the media player to couple to a host computer, be inserted into a docking system, or receive an accessory device. There are today many different types of accessory devices that can interconnect to the media player. For example, a remote control can be connected to the connector or port to allow the user to remotely control the media player. As another example, an automobile can include a connector and the media player can be inserted onto the connector such that an automobile media system can interact with the media player, thereby allowing the media content on the media player to be played within the automobile.

With the introduction of various media types (images and video), communication between a media player and an accessory may be confusing to end users. Furthermore, it may be difficult to determine, if at all, whether information has been successfully transferred between a media player and an accessory.

Thus, there is a need for improved techniques to enable manufacturers of electronic devices to exchange information.

BRIEF SUMMARY OF THE INVENTION

A method, system, and connector interface for transferring status information between a media player and an accessory is disclosed. The method includes determining, by the accessory, when a button event occurs; and transmitting, by the accessory, at least one button status command to the media player, where the one or more button status commands comprise a context-specific button status command and at least one command associated with a particular media type.

According to the method and system disclosed herein, the media player and accessory may utilize a plurality of commands utilized in a variety of environments such as within a connector interface system environment to facilitate the transfer of status information.

BRIEF DESCRIPTION OF THE DRAWINGS

FIGS. 1A and 1B illustrate a docking connector in accordance with the present invention.

FIG. 3A illustrates the connector pin designations for the docking connector.

FIG. 3B illustrates the connection pin designations for the remote connector.

FIG. 4B illustrates a reference schematic diagram for an accessory power source.

FIG. 4C illustrates a reference schematic diagram for a system for detecting and identifying accessories for the docking connector.

FIG. 4D is a reference schematic of an electret microphone that may be connected to the remote connector.

DETAILED DESCRIPTION OF THE INVENTION

Figure 2A:
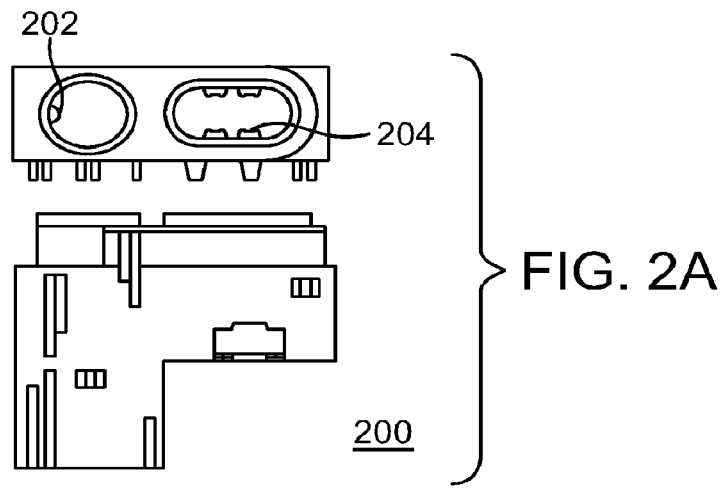
FIG. 2A is a front and top view of a remote connector in accordance with the present invention.

The present invention relates generally to electrical devices and more particularly to electrical devices such as media players that communicate with accessory devices. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

In a method and system in accordance with the present invention, media players and accessories are able to exchange status information using status commands. For example, in one embodiment, when the accessory determines that a button event occurs, the accessory transmits at least one button status command to the media player. The button status command includes one or more of a context-specific button status command, an image button status command, a video status button command, and an audio button status command. The media player may then transmit at least one acknowledgement status command to the accessory in response to the button status command. The media player and the accessory may utilize status commands, which may include commands associated with dedicated button status commands for different media types (e.g. image/slideshow, video, audio, etc.). The commands provide media control commands that support not only basic buttons such as play/pause, volume up, volume down, next track, and previous track but also media control commands that support context specific buttons such as next album, previous album, down arrow, etc. The media player and accessory may utilize the plurality of commands utilized in a variety of environments to facilitate the transfer of status information. One such environment is within a connector interface system environment such as described in detail hereinbelow.

Connector Interface System Overview

To describe the features of the connector interface system in accordance with the present invention in more detail, refer now to the following description in conjunction with the accompanying drawings.

Docking Connector

FIGS. 1A and 1B illustrate a docking connector 100 in accordance with the present invention. Referring first to FIG. 1A, the keying features 102 are of a custom length 104. In addition, a specific key arrangement is used where one set of keys is separated by one length at the bottom of the connector and another set of keys is separated by another length at the top of the connector. The use of this key arrangement prevents noncompliant connectors from being plugged in and causing potential damage to the device. The connector for power utilizes a Firewire specification for power. The connector includes a first make/last break contact to implement this scheme. FIG. 1B illustrates the first make/last break contact 202 and also illustrates a ground pin and a power pin related to providing an appropriate first make/last break contact. In this example, the ground pin 204 is longer than the power pin 206. Therefore, the ground pin 204 would contact its mating pin in the docking accessory before the power pin 206, minimizing internal electrical damage of the electronics of the device.

In addition, a connector interface system in accordance with the present invention uses both USB and Firewire interfaces as part of the same docking connector alignment, thereby making the design more compatible with different types of interfaces, as will be discussed in detail hereinafter. In so doing, more remote accessories can interface with the media player.

Remote Connector

Figure 2B:
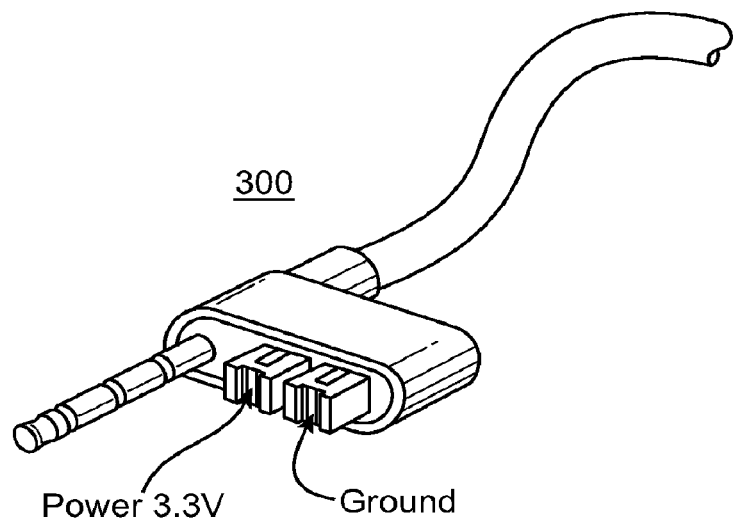
FIG. 2B illustrates a plug to be utilized in the remote connector.
Figure 2C:
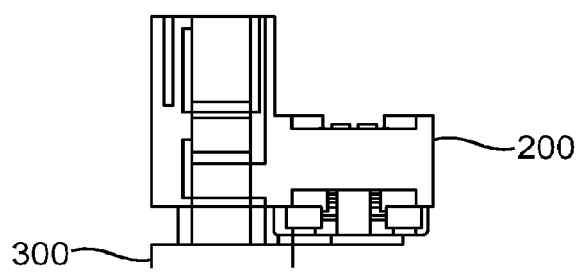
FIG. 2C illustrates the plug inserted into the remote connector.

The connection interface system also includes a remote connector which provides for the ability to output and input audio, and output video, and which also provides I/O serial protocol. FIG. 2A is a front and top view of a remote connector 200 in accordance with the present invention. As is seen, the remote connector 200 includes a top headphone receptacle 202, as well as a second receptacle 204 for remote devices. FIG. 2B illustrates a plug 300 to be utilized in the remote connector. The plug 300 allows the functions to be provided via the remote connector. FIG. 2C illustrates the plug 300 inserted into the remote connector 200. Heretofore, all of these features have not been implemented in a remote connector. Therefore, a standard headphone cable can be plugged in, but also special remote control cables, microphone cables, and video cables could be utilized with the remote connector.

To describe the features of the connector interface system in more detail, please find below a functional description of the docking connector, remote connector and a command set in accordance with the present invention.

Docking and Remote Connector Specifications

For an example of the connector pin designations for both the docking connector and for the remote connector for a media player such as an iPod device by Apple Inc., refer now to FIGS. 3A and 3B. FIG. 3A illustrates the connector pin designations for the docking connector. FIG. 3B illustrates the connection pin designations for the remote connector.

Docking Connector Specifications

Figure 4A:
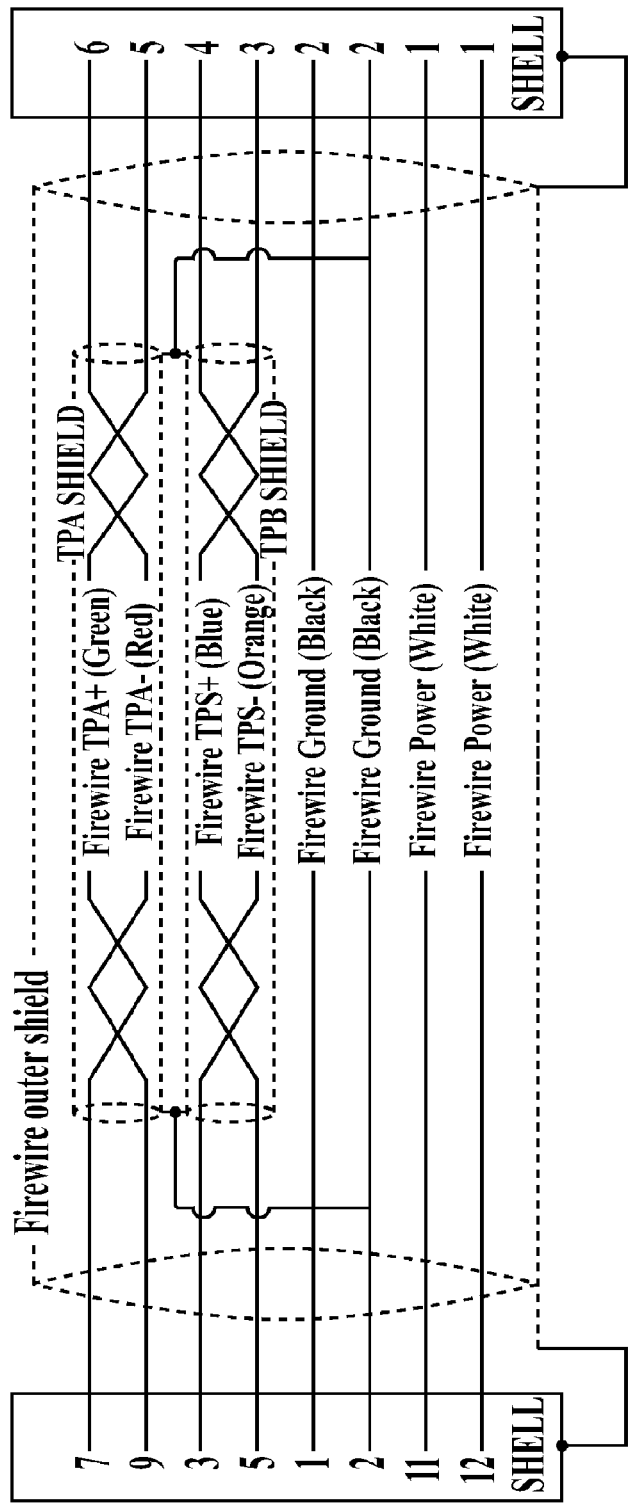
FIG. 4A illustrates a typical FireWire connector interface for the docking connector.

FIG. 4A illustrates a typical Firewire connector interface for the docking connector. The following are some exemplary specifications: Firewire power (8V-30V DC IN, 10 W Max). In one embodiment, Firewire may be designed to the IEEE 1394 A Spec (400 Mb/s).

USB Interface

The media player provides two configurations, or modes, of USB device operation: mass storage and media player USB Interface (MPUI). The MPUI allows the media player to be controlled using a media player accessory protocol (MPAP) which will be described in detail later herein, using a USB Human Interface Device (HID) interface as a transport mechanism.

Accessory 3.3 V Power

FIG. 4B illustrates the accessory power source. The media player accessory power pin supplies voltages, for example, 3.0 V to 3.3V+/−5% (2.85 V to 3.465 V) over the 30-pin connector and remote connector (if present). A maximum current is shared between the 30-pin and Audio/Remote connectors.

By default, the media player supplies a particular current such as 5 mA. Proper software accessory detection is required to turn on high power (for example, up to 100 mA) during active device usage. When devices are inactive, they must consume less than a predetermined amount of power such as 5 mA current.

Accessory power is grounded through the Digital GND pins.

FIG. 4C illustrates a reference schematic diagram for a system for detecting and identifying accessories for the docking connector. The system comprises:

a) A resistor to ground allows the device to determine what has been plugged into docking connector. There is an internal pullup on Accessory Identify within the media player.

b) Two pins required (Accessory Identify & Accessory Detect)

FIG. 4D is a reference schematic of an electret microphone that may be connected to the remote connector.

Serial Protocol Communication:

a) Two pins used to communicate to and from device (Rx & Tx)

b) Input & Output (0V=Low, 3.3V=High)

Figure 5A:
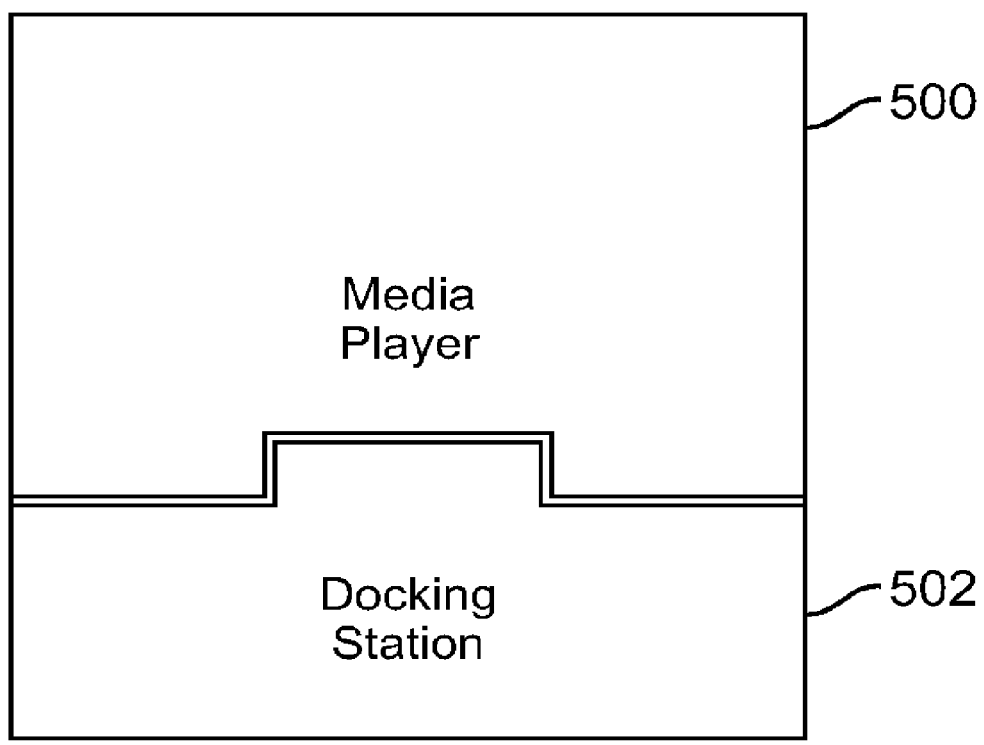
FIG. 5A illustrates a media player coupled to different accessories.
Figure 5B:
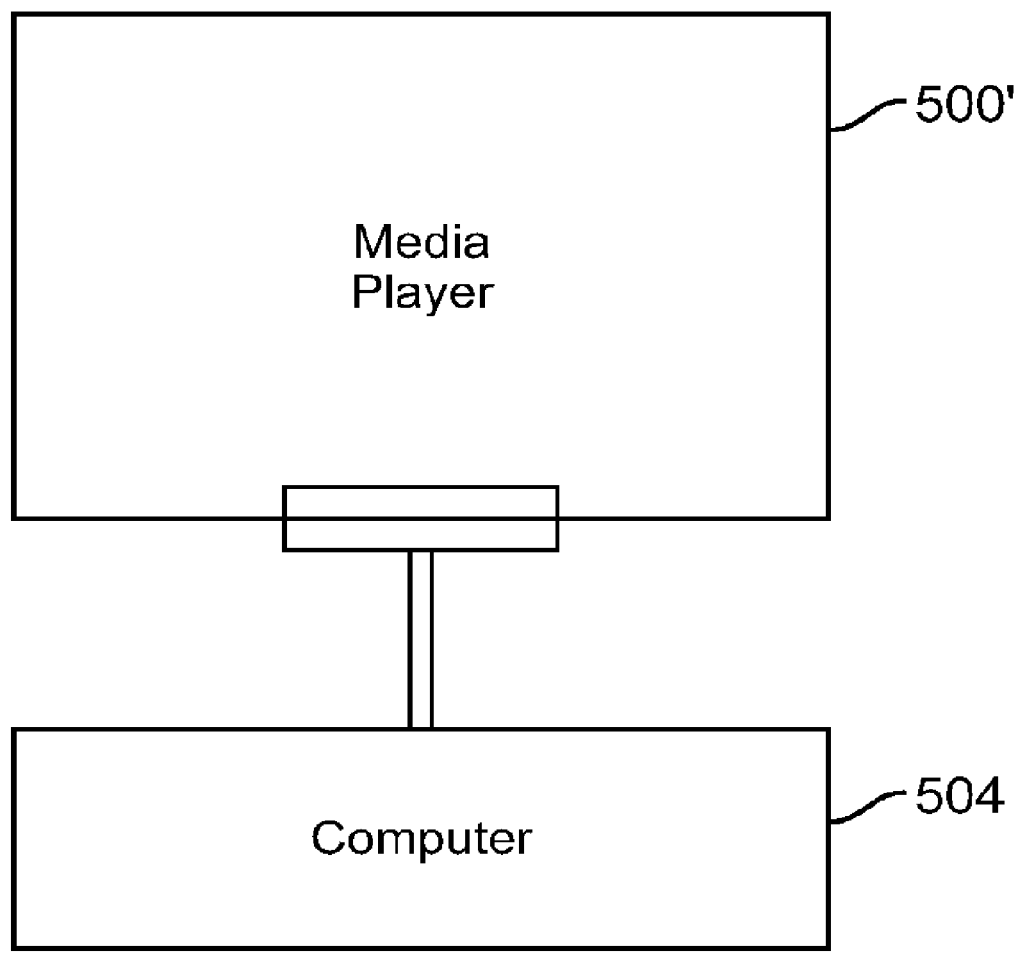
FIG. 5B illustrates the media player coupled to a computer.
Figure 5C:
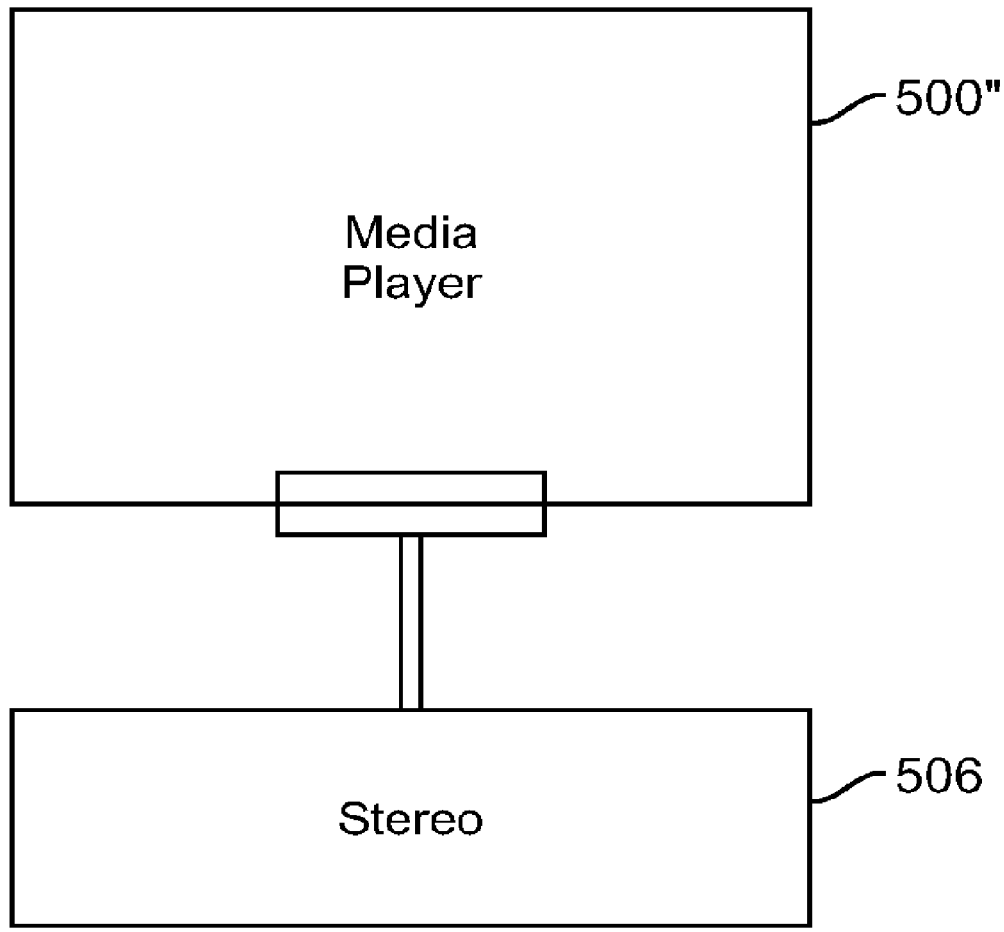
FIG. 5C illustrates the media player coupled to a car or home stereo system.
Figure 5D:
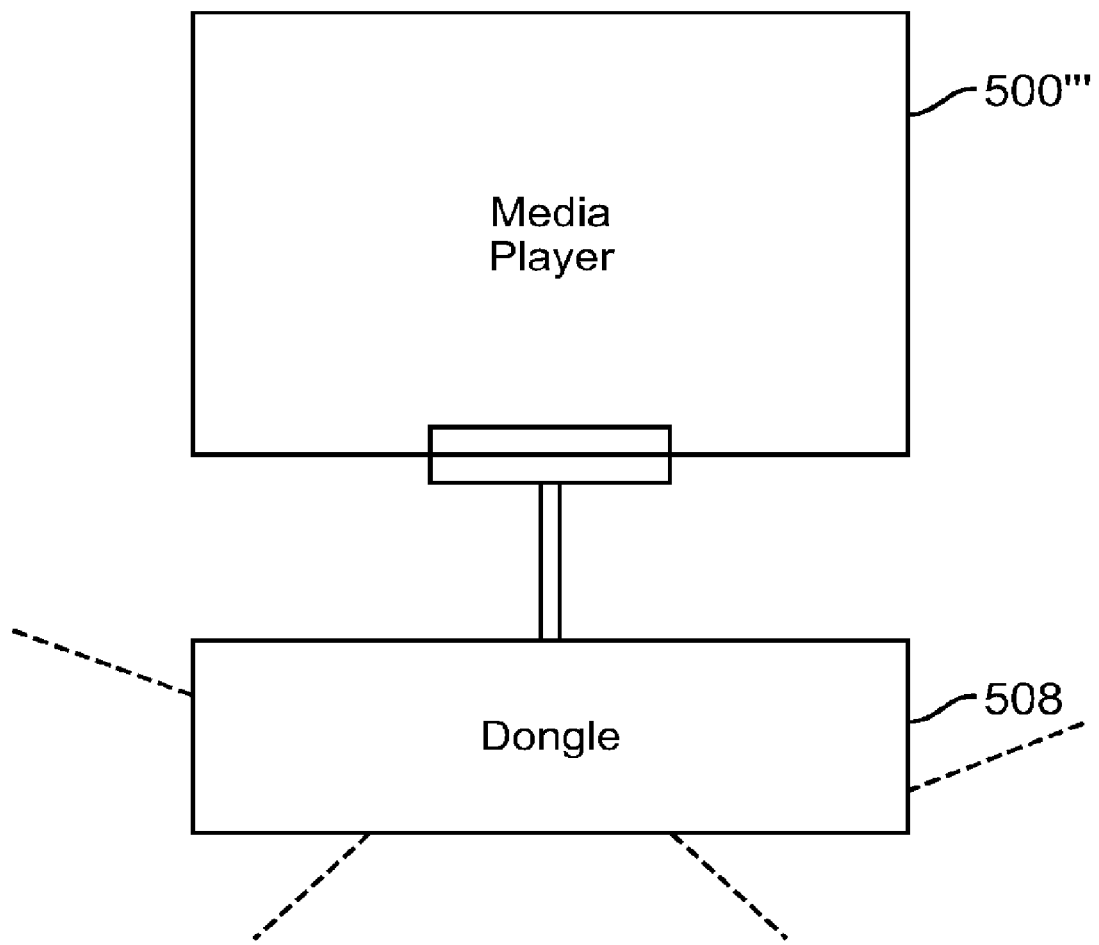
FIG. 5D illustrates the media player coupled to a dongle that communicates wirelessly with other accessories.
Figure 5E:
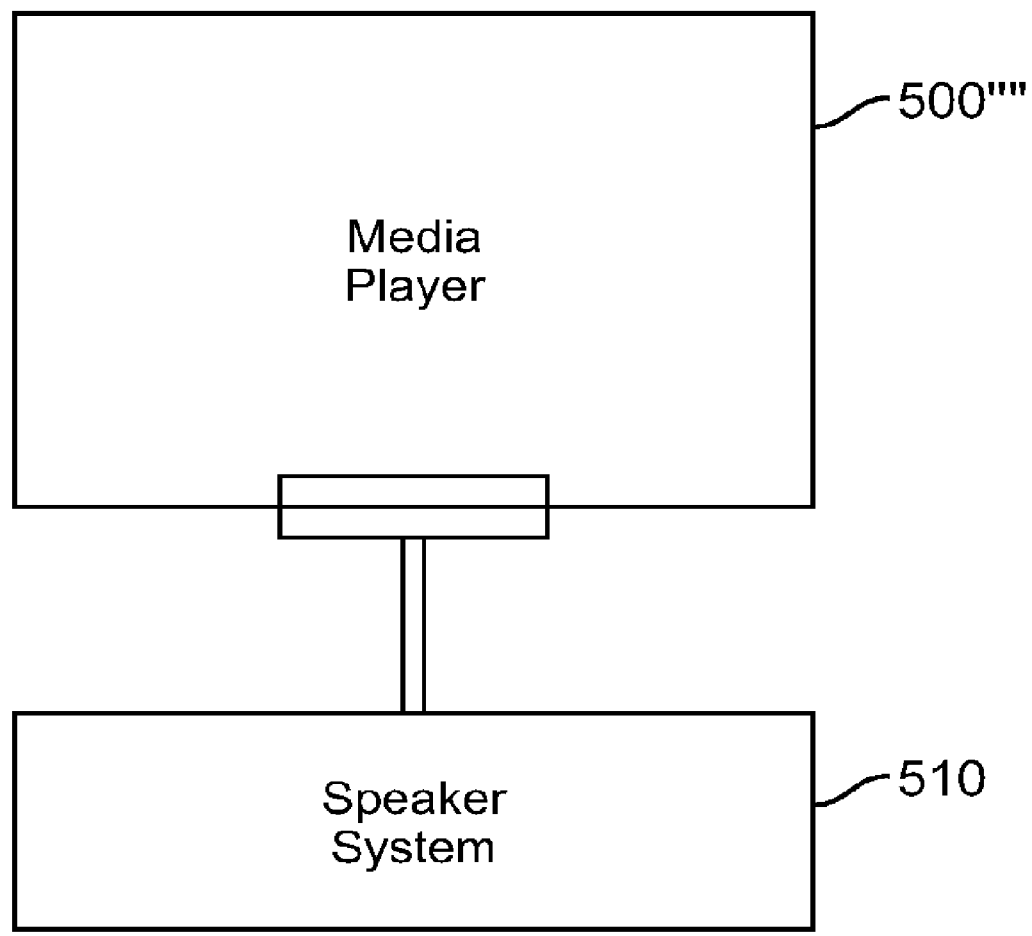
FIG. 5E illustrates the media player coupled to a speaker system.

As mentioned previously, media players connect to a variety of accessories. FIGS. 5A-5E illustrate a media player 500 coupled to different accessories. FIG. 5A illustrates a media player 500 coupled to a docking station 502. FIG. 5B illustrates the media player 500' coupled to a computer 504. FIG. 5C illustrates the media player 500" coupled to a car or home stereo system 506. FIG. 5D illustrates the media player 500''' coupled to a dongle 508 that communicates wirelessly with other devices. FIG. 5E illustrates the media player 500'''' coupled to a speaker system 510. As is seen, what is meant by accessories includes but is not limited to docking stations, chargers, car stereos, microphones, home stereos, computers, speakers, and accessories which communicate wirelessly with other accessories.

As mentioned previously, this connector interface system could be utilized with a command set for transferring status information between a media player and an accessory. In one embodiment, the accessory may be a host computer or any other electronic device or system that may communicate with the media player. It should be understood by one of ordinary skill in the art that although the above-identified connector interface system could be utilized with the command set, a variety of other connectors or systems could be utilized and they would be within the spirit and scope of the present invention. To describe the utilization of the command set in more detail refer now to the following description in conjunction with the accompanying Figure.

Power Conservation

Accessory device power management is important as media players transition to smaller physical sizes with the objective of extending battery life. Also, some accessories may draw power from the media player, and some accessories supply power to the media player. In one embodiment, as an accessory interacts with the media player, the media player may notify the accessory when the media player state changes (e.g., transitions to on/sleep/hibernate/off states, etc.). In one embodiment, accessory power will be in a low-power mode by default, and will be raised to a high-power mode during playback if the accessory requests intermittent high power. A power management policy may be applied for multi-function devices.

In one embodiment, an accessory is responsible for keeping its power consumption below a preset maximum allowed limit for each media player state. For example, as indicated above, the accessory power may be completely shut off when the media player enters hibernate and off states. Accordingly, in such states, an accessory that is powered by a media player will be unable to wake the media player. In one embodiment, if the media player is in a sleep state, the serial accessory should transmit any packets sent to the media player with a sync byte followed by a short delay before sending the packet. When waking from a sleep state, the accessory may be required to re-identify and re-authenticate itself (as with other devices using the device identification commands and/or authentication commands). Self-powered accessories should detect the presence of media player accessory power and initiate the identification process.

Remote Protocol

A remote protocol provides commands that enable the media player and an accessory to interact remotely. For example, as described in more detail below, in one embodiment, some commands enable the accessory to transmit button commands to the media player to manipulate the user interface (UI) of the media player. In one embodiment, the remote protocol transmits to the media player command packets, which contain one or more button status commands, and the media player interprets the button status commands based on a UI application context (e.g., media player UI application context).

Command Functionality

Although a plurality of commands is described hereinbelow, one of ordinary skill in the art recognizes that many other commands could be utilized and their use would be within the spirit and scope of the present invention. Accordingly, the list of commands below is representative, but not exhaustive, of the types of commands that could be utilized to transfer and store data between a media player and an accessory. Furthermore, it is also readily understood by one of ordinary skill in the art that a subset of these commands could be utilized by a media player or an accessory and that use would be within the spirit and scope of the present invention. A description of the functionality of some of these commands is described below.

Status Commands

Figure 6:
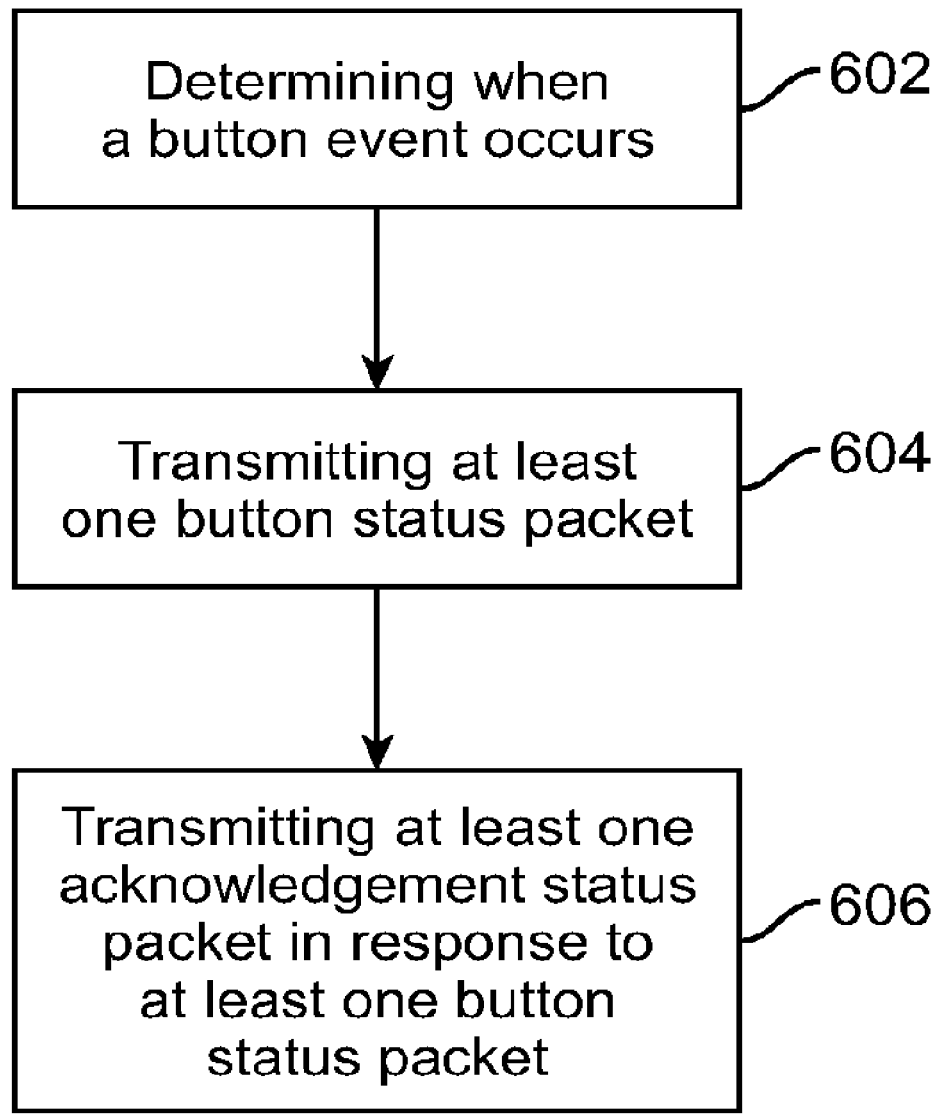
FIG. 6 is a flow chart, which illustrates a process for facilitating communication between a media player and an accessory.

FIG. 6 is a flow chart, which illustrates a process for facilitating communication between a media player and an accessory. As FIG. 6 illustrates, the process begins in step 602 where one of the media player and the accessory determines when a button event occurs. In one embodiment, a button event occurs when a user selects or presses a control button (e.g., on the accessory). In one embodiment, a command may be utilized to determine when a button event has occurred. Next, in step 604 one of the media player and the accessory transmits at least one button status command to the other of the media player and the accessory, wherein the one or more button status commands include one or more of context-specific button status commands, image button status commands, video commands, and audio button status commands. The transmission of the button status reports occurs when a button event occurs. A button status command includes a button status, which is a bitmask representing each button that is currently pressed. In one embodiment, button status commands are transmitted repeatedly to the media player at preset intervals (e.g., between 30-100 ms) while one or more buttons are pressed. When all buttons are released, the accessory transmits a button status command that indicates that no buttons are pressed.

As described in more detail below, there are dedicated button status commands for each media type (e.g., image/slideshow, video, audio, etc.). In one embodiment media control button status bits may be organized such that the most frequently used buttons will be assigned low bit positions. This may reduce the button status command sizes for frequently used buttons. Button status commands provide media control commands that support not only basic buttons such as play/pause, volume up, volume down, next track, and previous track, but also support media control commands that support context specific buttons such as next album, previous album, down arrow, etc. In one embodiment, an accessory may query the remote protocol to determine which particular media control commands the media player supports.

Button status is maintained separately for all ports and all commands. As a result, buttons may be in different states for different media control types. In one embodiment, for a given port and media control type, if a command has not been received within a preset time period after the last button status command, the button status will be reset to an "all buttons up" state.

In some embodiments, some commands may require authentication. For example, context specific send button status commands may require authentication for USB ports. Media control commands require authentication and will therefore require use of a command for device identification (ID) with an authentication option enabled.

Acknowledge Status Command

Still referring to FIG. 6, in a step 606, one of the media player and the accessory transmits at least one acknowledgement status command to the other of the media player and the accessory in response to at least one button status command. In one embodiment, the media player may transmit an acknowledgement status command to the accessory in response to some, but not necessarily all, commands. The acknowledgement status command includes an acknowledgement command that indicates a command status, which may include whether the command was received. The command status may also indicate whether the received command does not return any data, whether the received command includes a bad parameter, whether the received command is unsupported by the media player, and/or whether the received command is invalid.

In one embodiment, parameters for the acknowledgment command may include: Command OK, Command failed (valid command, did not succeed), Out of resources (media player internal allocation failed), Bad parameter (command or input parameters invalid), Command pending (cmdPendTime parameter returned), Not authenticated (not authenticated), Mismatched authentication protocol version, Command ID for which the response is being sent, etc.

In addition to the bitmask that indicates each button that is currently pressed, a status command that the accessory transmits to the media player may include various types of button status commands such as context-specific button status commands, image button status commands, video button status commands, and audio button status commands.

Context-Specific Button Status Command

The context-specific button status command is a command that is associated with particular functions. The accessory transmits a status command containing a context-specific button status command to the media player when a context-specific button event occurs. In one embodiment, parameters for a context-specific button status bitmask may include: PlayPause, VolumeUp, VolumeDown, NextTrack, PreviousTrack, NextAlbum, PreviousAlbum, Stop, Play/resume, Pause, MuteToggle, NextChapter, PreviousChapter, NextPlaylist, PreviousPlaylist, ShuffleSettingAdvance, RepeatSettingAdvance, PowerOn, PowerOff, BacklightFor30Seconds, BeginFF, BeginRew, RemoteMenu, RemoteSelect, RemoteUpArrow, RemoteDownArrow, etc. In one embodiment, the media player may not return an acknowledgement packet to the device in response to this command.

Image Button Status Command

The image button status command is a command that is associated with image-based media (e.g., photos, slide shows, etc.). The accessory transmits a status command containing an image button status command to the media player when a image-specific button event occurs. In one embodiment, parameters for an image-specific button status bitmask may include: PlayPause, NextImage, PreviousImage, Stop, Play/resume, Pause, ShuffleAdvance, RepeatAdvance, etc. In one embodiment, in response to the image button status command, the media player will return an acknowledgement status command to the accessory with the command status.

Video Button Status Command

The video button status command is a command that is associated with video media (e.g., movies, television shows, etc.). The accessory transmits a status command containing a video button status command to the media player when a video-specific button event occurs. In one embodiment, parameters for a video-specific button status bitmask may include: PlayPause, NextVideo, PreviousVideo, Stop, Play/resume, Pause, BeginFF, BeginREW, Next chapter, Previous chapter, Next frame, Previous frame, Caption advance, etc. In one embodiment, in response to the video button status command, the media player will return an acknowledgement status command to the accessory with the command status.

Audio Button Status Command

The audio button status command is a command that is associated with audio media (e.g., music, audiobooks, podcasts, etc.). The accessory transmits a status command containing an audio button status command to the media player when an audio-specific button event occurs. In one embodiment, parameters for an audio-specific button status bitmask may include: PlayPause, VolumeUp, VolumeDown, NextTrack, PreviousTrack, NextAlbum, PreviousAlbum, Stop, Play/resume, Pause, MuteToggle, NextChapter, PreviousChapter, NextPlaylist, PreviousPlaylist, ShuffleSettingAdvance, RepeatSettingAdvance, BeginFF, BeginRew, Record, etc. In one embodiment, in response to the audio button status command, the media player will return an acknowledgement status command to the accessory with the command status.

A method and system in accordance with the present invention, media players and accessories are able to exchange status information using status commands has been disclosed. In one embodiment, when the accessory determines that a button event occurs, the accessory transmits at least one button status command to the media player. The media player may then transmit at least one acknowledgement status command to the accessory in response to the button status command.

Although the present invention has been described in accordance with the embodiments shown, one of ordinary skill in the art will readily recognize that there could be variations to the embodiments and those variations would be within the spirit and scope of the present invention. For example, the present invention can be implemented using hardware, software, a computer readable medium containing program instructions, or a combination thereof. Software written according to the present invention is to be either stored in some form of computer-readable medium such as memory or CD-ROM, or is to be transmitted over a network, and is to be executed by a processor. Consequently, a computer readable medium is intended to include a computer readable signal, which may be, for example, transmitted over a network. Accordingly, many modifications may be made by one of ordinary skill in the art without departing from the spirit and scope of the appended claims.

What is claimed is:

1. A method for operating a media player, the method comprising:
   receiving, by the media player, a button status command from an accessory communicatively coupled to the media player, the button status command being a command from a group of supported commands consisting of a context-specific button status command to control particular actions of the media player and one or more media-type-specific button status commands to control playback of one or more different media types,
   determining, by the media player, an action to be performed in response to the button status command, wherein the determination is based at least in part on whether the button status command is the context-specific button status command or one of the one or more media-type-specific button status commands; and
   performing the determined action.

2. The method of claim 1 wherein in the event that the context-specific button status command is received, the determining is performed in a context associated with an active application executing on the media player.

3. The method of claim 2 wherein in the event that the media-type-specific button status command is received, the determining is performed in a context associated with an application on the media player that plays media of the specific type.

4. The method of claim 1 further comprising transmitting to the accessory, by the media player, an acknowledgement status command in response to the button status command.

5. The method of claim 1 wherein the one or more media-type-specific button status commands include:

an image button status command associated with a playback application for still images;
a video button status command associated with a playback application for video; and
an audio button status command associated with a playback application for audio.

6. The method of claim 4 wherein the button status commands include support a plurality of buttons including at least:
play/pause;
volume up;
volume down;
next track;
previous track;
next image; and
previous image.

7. The method of claim 4 wherein the button status commands include support a plurality of context-specific buttons including at least:
play/pause;
volume up;
volume down;
next track;
previous track;
next image;
previous image;
next album;
previous album;
up arrow; and
down arrow.

8. The method of claim 1 wherein receipt of the button status command is preceded by an authentication of the accessory.

9. A media player comprising:
control logic configured to execute a plurality of applications for playing back stored media, each application associated with a different media type;
an interface configured to communicably couple the media player to an accessory; and
command logic coupled to the control logic and the interface, the command logic being configured to receive from the accessory a button status command from a group of supported commands consisting of a context-specific button status command associated with particular functions of the media player and one or more media-type-specific button status commands, each media-type-specific button status command being associated with a playback application for a different media type,
wherein the control logic is further configured to determine an action to be performed in response to the button status command, wherein the determination is based at least in part on whether the button status command is the context-specific button status command or one of the one or more media-type-specific button status commands, and to perform the determined action.

10. The media player of claim 9 wherein the control logic is further configured to notify the accessory when the state of the media player changes.

11. The media player of claim 10 wherein the states of the media player include at least: on, off, sleep and hibernate.

12. The media player of claim 10 wherein the control logic is further configured to transmit to the accessory an acknowledgement status command in response to the button status command.

13. The media player of claim 10 wherein the one or more media-type-specific button status commands include:

an image button status command associated with a playback application for still images;
a video button status command associated with a playback application for video; and
an audio button status command associated with a playback application for audio.

14. A method for transferring status information between a media player and an accessory communicatively coupled to the media player, the method comprising:
determining, by the accessory, when a button event occurs; and
transmitting, by the accessory, at least one button status command to the media player, the button status command being a command from a group of supported commands consisting of a context-specific button status command to control particular actions of the media player and one or more media-type-specific button status commands to control playback of one or more different media types.

15. The method of claim 14 further comprising receiving from the media player, an acknowledgement status command in response to the button status command.

16. The method of claim 14 wherein the one or more media-type-specific button status commands include:
an image button status command associated with a playback application for still images;
a video button status command associated with a playback application for video; and
an audio button status command associated with a playback application for audio.

17. The method of claim 14 wherein the button status commands support a plurality of buttons including at least:
play/pause;
volume up;
volume down;
next track;
previous track;
next image; and
previous image.

18. The method of claim 14 wherein the button status commands support a plurality of context-specific buttons including at least:
play/pause;
volume up;
volume down;
next track;
previous track;
next image;
previous image;
next album;
previous album;
up arrow; and
down arrow.

19. The method of claim 14 wherein transmitting, by the accessory, at least one button status command to the media player is preceded by transmitting, by the accessory, a response to an authentication query received from the media player.

20. An accessory comprising:
a device for transferring data;
an interface coupled to the device; and a command set in communication with the interface, wherein the command set enables the media player and an accessory to transfer status information therebetween, the command set comprising:
at least one command for determining, by the accessory, when a button event occurs; and a plurality of commands for transmitting, by the accessory, to the media player at least one button status command from a group of supported commands consisting of a context-specific button status command associated with particular functions of the media player and one or more media-type-specific button status commands, each media-type-specific button status command being associated with a playback application for a different media type.

21. The accessory of claim 20 further comprising receiving from the media player, an acknowledgement status command in response to the button status command.

22. The accessory of claim 20 wherein the one or more media-type-specific button status commands include:
   an image button status command associated with a playback application for still images;
   a video button status command associated with a playback application for video; and
   an audio button status command associated with a playback application for audio.

23. The accessory of claim 20 wherein the button status commands include support a plurality of buttons including at least:
   play/pause;
   volume up;
   volume down;
   next track;
   previous track;
   next image; and
   previous image.

24. The accessory of claim 20 wherein the button status commands include support a plurality of context-specific buttons including at least:
   play/pause;
   volume up;
   volume down;
   next track;
   previous track;
   next image;
   previous image;
   next album;
   previous album;
   up arrow; and
   down arrow.

25. The accessory of claim 20 wherein the interface is configured to receive notifications from the accessory regarding the state of the media player.

26. The accessory of claim 25 wherein the states of the media player include at least: on, off, sleep and hibernate.

27. The accessory of claim 26 wherein the accessory may power off when the state of the media player is off or hibernate.

28. The accessory of claim 20 wherein the interface is configured to transmit the status information after sending a sync byte to the media player when the media player is in a sleep state.

29. The accessory of claim 28 wherein the sync byte comprises a wake from sleep state command.

\* \* \* \* \*